United States Patent
Brandt et al.

(10) Patent No.: US 12,158,071 B2
(45) Date of Patent: Dec. 3, 2024

(54) TUNNEL BORING MACHINE HAVING A DEVICE FOR DETECTING A CONTENT OF CRITICAL GAS

(71) Applicant: HERRENKNECHT AKTIENGESELLSCHAFT, Schwanau (DE)

(72) Inventors: Jens Brandt, Bad Krozingen (DE); Markus Münchbach, Reute (DE); Albert Feisst, Achern-Onsbach (DE)

(73) Assignee: HERRENKNECHT AKTIENGESELLSCHAFT, Schwanau (DE)

( * ) Notice: Subject to any disclaimer, the term of this patent is extended or adjusted under 35 U.S.C. 154(b) by 313 days.

(21) Appl. No.: 17/798,613

(22) PCT Filed: Feb. 25, 2021

(86) PCT No.: PCT/EP2021/054714
§ 371 (c)(1),
(2) Date: Aug. 10, 2022

(87) PCT Pub. No.: WO2021/170733
PCT Pub. Date: Sep. 2, 2021

(65) Prior Publication Data
US 2023/0140625 A1    May 4, 2023

(30) Foreign Application Priority Data
Feb. 28, 2020   (DE) .......................... 102020105345.2

(51) Int. Cl.
*E21D 9/00*   (2006.01)
*E21D 9/11*   (2006.01)
(Continued)

(52) U.S. Cl.
CPC ............ *E21D 9/003* (2013.01); *F04B 45/041* (2013.01); *F04B 45/0536* (2013.01);
(Continued)

(58) Field of Classification Search
CPC ....... E21D 9/003; E21D 9/112; F04B 45/041; F04B 45/0536; G01N 1/2202; G01N 1/2247; G01N 2001/2267; E21F 17/18
See application file for complete search history.

(56) References Cited

U.S. PATENT DOCUMENTS

| | | |
|---|---|---|
| 2008/0011248 A1 | 1/2008 | Cutlip et al. |
| 2016/0281500 A1 | 9/2016 | Walker et al. |

(Continued)

FOREIGN PATENT DOCUMENTS

| | | | | |
|---|---|---|---|---|
| AU | 2021399680 A1 | * | 3/2023 | ........... E21B 49/005 |
| CN | 110125129 A | | 8/2019 | |

(Continued)

OTHER PUBLICATIONS

AU-2021399680-A1 English Translation (Year: 2023).*
WO-2023207041-A1 English Translation (Year: 2023).*

*Primary Examiner* — Ryan D Walsh
(74) *Attorney, Agent, or Firm* — Tarolli, Sundheim, Covell & Tummino LLP

(57) ABSTRACT

A device for detecting a content of critical gas in a mining chamber of a tunnel boring machine includes a separation module by which a fluid fed in via an extraction line connection is cleaned of solid and liquid components. A gas line arrangement arranged downstream of the separation module in the flow direction of the fluid carries the fluid, including substantially only gaseous components, through a pressure reducer and through a flow control valve of a metering module by which the gas to be analyzed can be delivered in a controlled manner assisted by a double (Continued)

Figure 1:
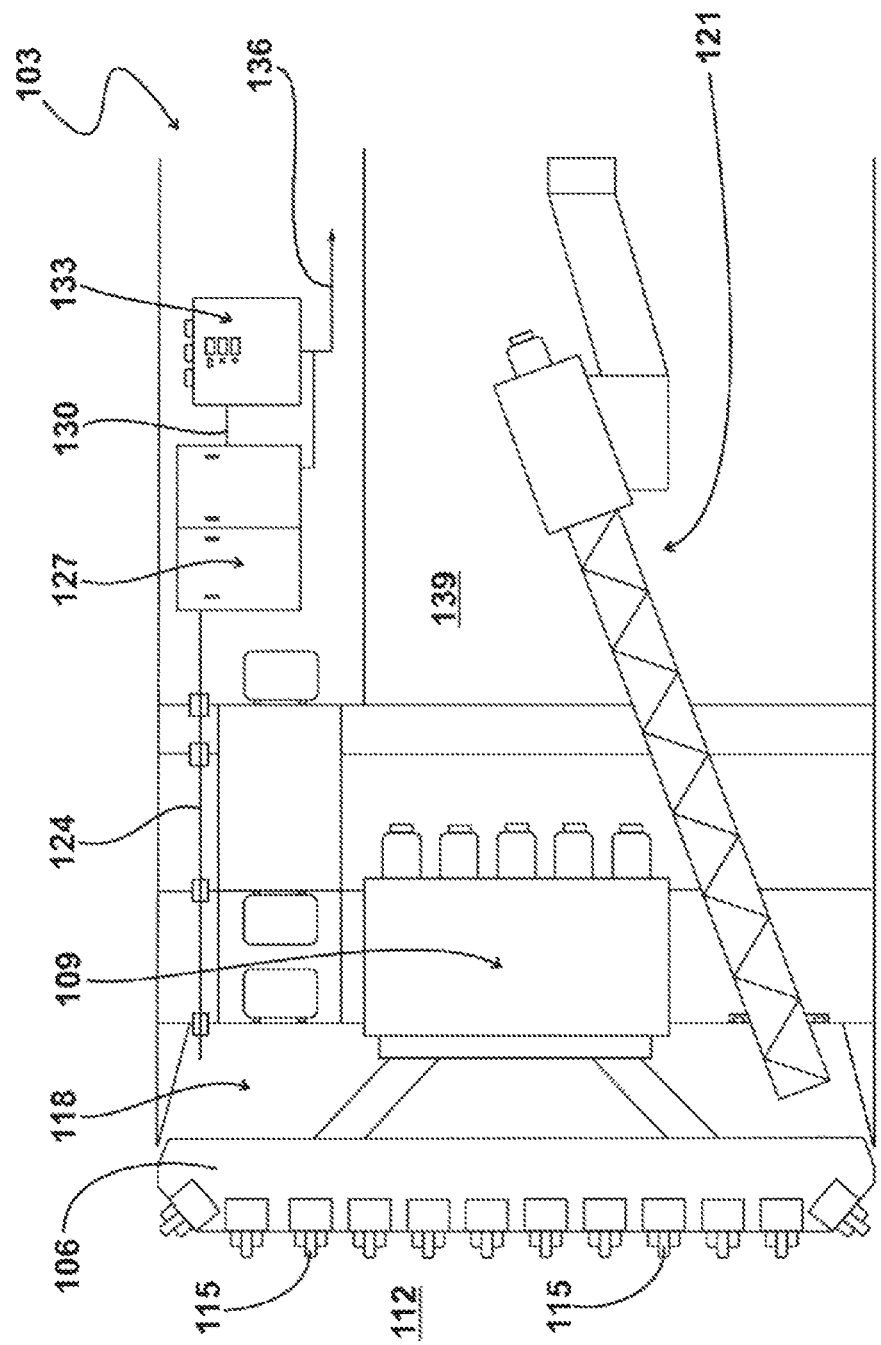

diaphragm pump and a pressure stabilizer to a gas analysis unit even at high pressures in the cavity.

12 Claims, 4 Drawing Sheets

(51) Int. Cl.
*E21F 17/18* (2006.01)
*F04B 45/04* (2006.01)
*F04B 45/053* (2006.01)
*G01N 1/22* (2006.01)

(52) U.S. Cl.
CPC .......... *G01N 1/2202* (2013.01); *G01N 1/2247* (2013.01); *E21D 9/112* (2013.01); *E21F 17/18* (2013.01); *G01N 2001/2267* (2013.01)

(56) References Cited

U.S. PATENT DOCUMENTS

| | | |
|---|---|---|
| 2017/0254787 A1 | 9/2017 | Campanella et al. |
| 2018/0171786 A1 | 6/2018 | Kasprzykowski et al. |
| 2020/0308963 A1 | 10/2020 | Dröge |

FOREIGN PATENT DOCUMENTS

| | | | |
|---|---|---|---|
| CN | 110792447 A | 2/2020 | |
| DE | 1049810 B | 2/1959 | |
| DE | 3445578 A1 | 6/1986 | |
| DE | 3741460 A1 | 6/1989 | |
| JP | 2678563 B2 | 11/1997 | |
| JP | 2004300721 A | 10/2004 | |
| WO | 2018080318 A1 | 5/2018 | |
| WO | WO-2023207041 A1 * | 11/2023 | ............. E21C 41/28 |

\* cited by examiner

TUNNEL BORING MACHINE HAVING A DEVICE FOR DETECTING A CONTENT OF CRITICAL GAS

The invention relates to a tunnel boring machine according to the preamble of claim 1.

Such a tunnel boring machine is known from JP 2678563 B2. The generic tunnel boring machine is provided with a device having an extraction line, which is fluidically connected to a cavity arranged on the rear side of a cutting wheel. On the side opposite the cavity, the extraction line is connected to a separation module, through which a gas to be detected is separable from a fluid. The separated gas can be fed into a gas analysis unit, which is arranged downstream of the separation module, and through which warning messages, such as an alarm in the case of critical gas conditions, can be activated.

A further tunnel boring machine having a device for detecting a content of critical gas is known from JP2004-300721A. This previously known device has a separation module for separating the gas to be detected from a fluid taken from a discharge unit and a metering module arranged downstream of the separation module for controlled charging of a gas analysis unit with separated gas. In the previously known device, the gas to be detected is separated by changing the pressure conditions in a gas-liquid mixture with solid components. In order to detect a content of critical, in particular explosive, gas such as methane, a portion of the gas that has escaped from this mixture is transferred to a gas analysis unit.

Devices for analyzing a gas extracted from a fluid originating from a borehole are known from US 2018/0171786 A1 and WO 2019/143362 A1, wherein in this case a separation module for separating the gas to be detected from the fluid and a metering module downstream of the separation module for controlled feeding of separated gas to a gas analysis unit, a pressure reducer and a flow control valve are present.

The object of the invention is to specify a tunnel boring machine of the above-mentioned type, which is characterized by detecting a content of critical gas in a cavity subject to relatively high pressure, but possibly also to pressure fluctuations, such as in case of strong pressure drops, and which is arranged on the rear side of a cutting wheel with an accuracy sufficient at least for a danger alarm, even under harsh, possibly rapidly and strongly variable operating conditions.

This object is achieved in a tunnel boring machine of the type mentioned with the characterizing features of claim 1.

Due to the fact that in the tunnel boring machine according to the invention the metering module has a pressure reducer and a flow control valve downstream of the pressure reducer, and that a double diaphragm pump is provided downstream of the pressure reducer, high pressures can be reduced in a controlled manner but also the flow rate of separated gas, which is important for a sufficiently reliable detection of a content of a critical gas, and which is delivered to a gas analysis unit, can be set and maintained with sufficient accuracy in case of a pressure drop.

Further advantageous developments of the invention are the subject matter of the dependent claims.

Further expedient developments and advantages of the invention result from the following description of exemplary embodiments of the invention with reference to the figures of the drawing.

Figure 2:
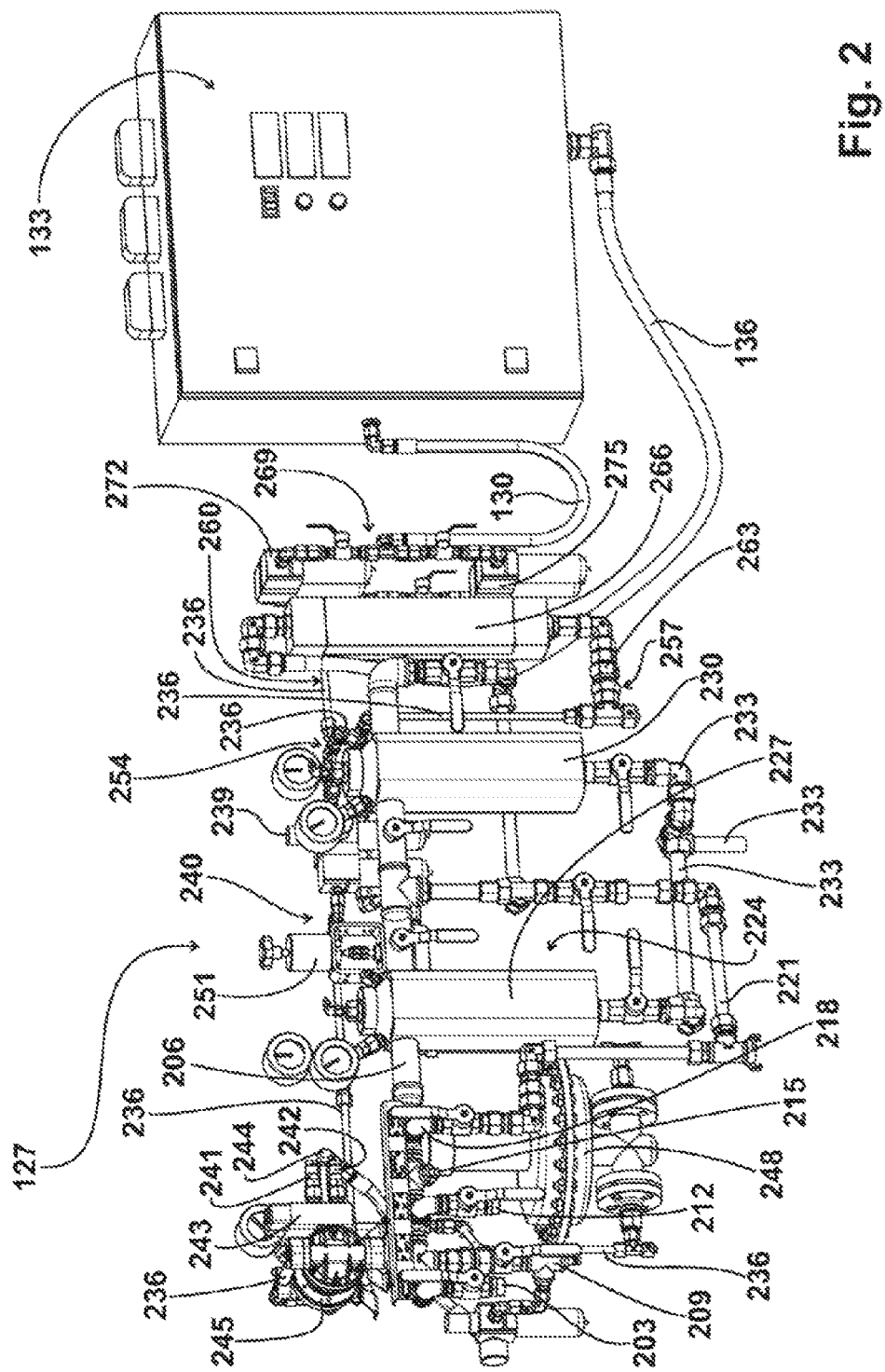
Figure 3:
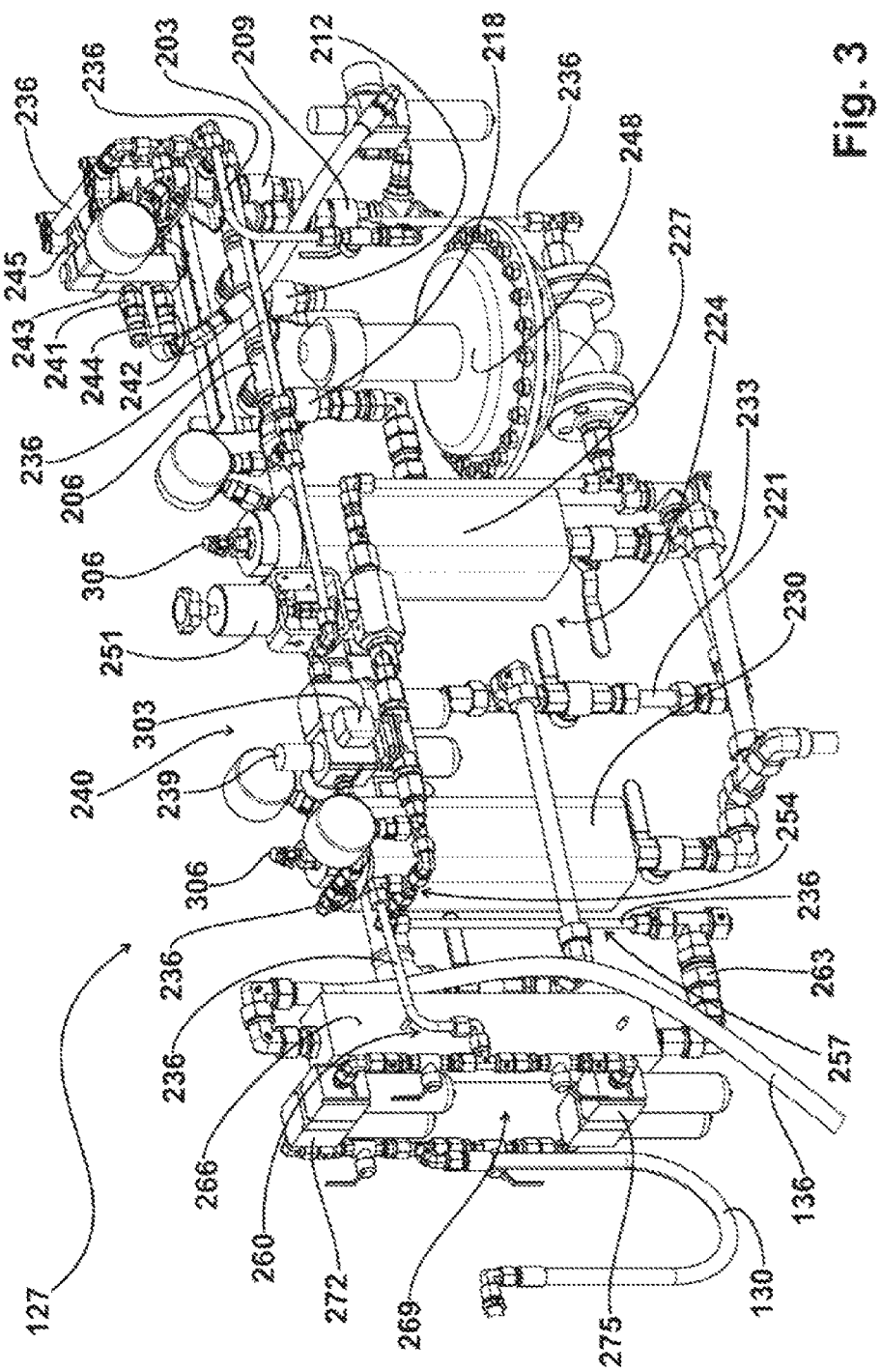
Figure 4:
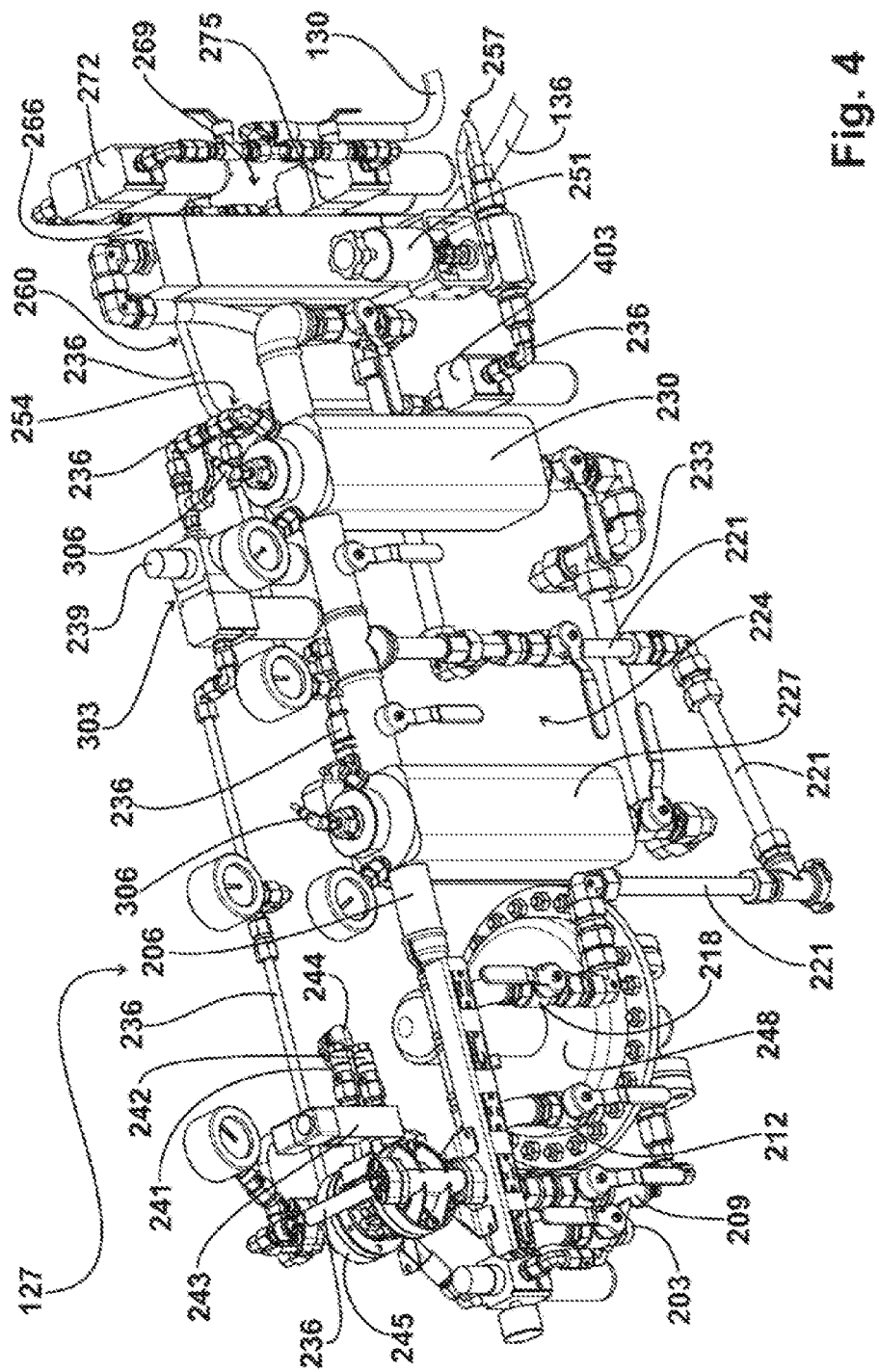

In particular:

FIG. 1 shows a highly schematic side view of an exemplary embodiment of a tunnel boring machine according to the invention with an embodiment of a device according to the invention, FIG. 2 shows a perspective view of the exemplary embodiment of a device according to the invention shown in FIG. 1 with a view of a front side accessible to an operator during operation and a gas analysis unit, FIG. 3 shows a perspective view of the exemplary embodiment according to FIG. 2 with a view of the rear side facing away from the front side and FIG. 4 shows a perspective view of another exemplary embodiment of a device according to the invention with a view of a rear side corresponding to the illustration in FIG. 3.

FIG. 1 shows an exemplary embodiment of a tunnel boring machine 103 according to the invention in a highly schematic side view. The tunnel boring machine 103 has a cutting wheel 106 on a front end in the advancing direction, which wheel can be rotated by means of a drive unit 109 and which is equipped with mining tools 115 adapted to the prevailing geology for excavating material on a working face 112.

On the side of the cutting wheel 106 facing away from the working face 112, there is a mining chamber 118 formed as a hollow space, which can be under a pressure of several 1,000 hectopascals (hPa), particularly in the case of a mining method working with pressure assistance. Material which is mined by the working face 112 and which has been conveyed into the mining chamber 118 can be removed via a removal unit 121 which is equipped, for example, with a screw conveyor.

In the exemplary embodiment according to the invention, an extraction line 124 opens at one end into the mining chamber 118, which is sealed against a passage for the extraction line 124, in its upper region, which is predominantly free of liquid and solids. The extraction line 124 is connected to a fluid processing unit 127 at its end remote from the mining chamber 118. The fluid present in the extraction area in the mining chamber 118, which due to the harsh mining conditions also contains liquid and solid components in addition to gaseous components, can thus be fed to the fluid processing unit 127 with the extraction line 124. The fluid processing unit 127 is connected to a gas analysis unit 133 via a measurement gas transfer line 130. Both the fluid processing unit 127 and the gas analysis unit 133 are connected to a discharge line 136, with which the individual components of the fluid extracted from the mining chamber 118 via the extraction line 124 can be discharged from a tunnel space 139 located at the rear of the working face 112.

FIG. 2 shows a perspective view on the front side accessible to an operator during normal operation, of the structure of the fluid processing unit 127 of an exemplary embodiment of a device according to the invention, which is typically used in a tunnel boring machine 103, which is explained by way of example with reference to FIG. 1. The fluid processing unit 127 according to FIG. 2 is configured on the inlet side with an extraction line connection 203, to which the extraction line 124 explained in FIG. 1 but not shown in FIG. 2 for clarity can be connected in a pressure-tight manner. The extraction line connection 203 communicates with an inlet portion of a fluid mixture line assembly 206, which is in turn connected to an air connection 209, a test gas connection 212, a service connection 215, and a water connection 218. The water connection 218 is connected to a water line arrangement 221, with which water can be supplied to the fluid mixture line arrangement 206 as required.

A separation module 224 with two series-connected separators 227, 230 in the exemplary embodiment is integrated in the fluid mixture line arrangement 206 downstream of the extraction line connection 203 and the further connections 209, 212, 215, 218 in the direction of flow of a fluid fed in via the extraction line connection 203. With the separators 227, 230, which are expediently set up for successive coarse and subsequent fine separation and which work by gravity, solid components such as smaller stones, sand and/or mud material and liquid components can be removed from the fluid originating from the mining chamber 118, so that in the direction of flow of the fluid, on the outlet side of the separation module 224, essentially only gaseous components are contained. The separators 227, 230 are connected in the bottom area to a discharge line arrangement 233, with which, as shown in FIG. 2, the liquid and solid material formed in the separators 227, 230 can be discharged, advantageously in a controlled manner by means of check valves.

After passing through the separation module 224 with an essentially complete separation of the solid and liquid components, the fluid then consisting essentially only of gaseous components enters a gas line arrangement 236 in which a pressure reducer 239 of a metering module 240 is integrated. By means of the pressure reducer 239, the inlet pressure in the gas line arrangement 236 can be reduced to an outlet pressure of typically around 1,000 hPa to around 2,000 hPa with a corresponding reduction in volumetric flow. In the gas line arrangement 236 there is also provided an integrated double diaphragm pump 245, which is resistant to abrasive components in the fluid such as grains of sand, which is connected to a first throttle valve 241 and to a second throttle valve 242 and which can be controlled by means of a solenoid control switch 243 operating with pressurized control air from a control air line 244, with which the pressure of the fluid in the direction of flow after the double diaphragm pump 245 can be increased to a certain overpressure if required.

The double diaphragm pump 245 has two diaphragms that are forcibly coupled to one another, which are supplied via the control air line 244 by the magnetic control switch 243, which is designed as a 3/2 control valve, for example, via a pulse-like voltage provided by a voltage pulse generator, not shown in FIG. 2, wherein the magnetic control switch 243 is activated above a certain voltage signal level, and which can be actuated alternately with the pressurized control air via a return spring after the voltage has dropped below the voltage signal level in such a way that a sufficiently high stroke capacity is provided at a sufficiently high clock frequency and an adjusted pressure in the control air line 244. As a result, less time is allocated on average to the low-pressure or low-volumetric flow range of the diaphragm after reaching the stroke end position and for resetting.

To smooth out remaining pressure fluctuations, particularly under atmospheric conditions in the mining chamber 118, i.e. without self-delivery of the fluid, the opening degrees of the throttle valves 241, 242 are set to a relatively small value, so that the used air escaping for relieving the diaphragm only escapes into the environment with a great deal of delay. As a result, if each diaphragm is reset before the initial position is reached, it transitions again to the next stroke and the opposite diaphragm has meanwhile taken over the lifting work essentially seamlessly.

In the flow direction of the fluid downstream of the double diaphragm pump 245, a pressure stabilizer 248 in the form of an expansion tank with a diaphragm for stabilizing the pressure in the gas line arrangement 236 and then a flow control valve 251 of the metering module 240 are integrated into the gas line arrangement 236, which is expediently formed as a needle valve for a fine adjustment of flow rate. In the flow direction of the fluid downstream of the flow control valve 251 there is a Y-junction 254, which subdivides the gas line arrangement 236 into a main arm 257 with a relatively large flow rate and in a secondary arm 260 with a lower flow rate compared to the flow rate in the main arm 257.

Arranging the flow control valve 251 upstream of the Y-junction 254 in the flow direction of the gaseous fluid has the advantage that the entire volumetric flow in the gas line arrangement 236 can be influenced in a targeted manner, taking into account the fluid-dynamic properties of downstream components in the flow direction of the fluid. If, for example, the drain line 136 is relatively long for operational reasons, this results in further pressure losses, which are associated with a corresponding reduction in the volumetric flow. In this case, the entire volumetric flow can be premetered to a value suitable for a relatively precise measurement by the gas analysis unit 133 with the aid of the flow control valve 251.

A volumetric flow measuring module 266 is integrated in the main arm 257 in the flow direction of the fluid downstream of a passive check valve 263 provided for safety reasons, with which the volumetric flow of gaseous fluid flowing through the main arm 257, which is in a fixed ratio to the volumetric flow flowing in the secondary arm 260, can be measured. The discharge line 136 of FIG. 1 is connected on the outlet side of the volumetric flow measurement module 266.

In turn, a secondary arm filter module 269 with two secondary arm filters 272, 275, which are connected in parallel for redundancy reasons, is integrated into the secondary arm 260 in order to remove residual contamination from the fluid flowing through the secondary arm 260 of the gas line arrangement 236 before it enters the sample gas transfer line 130 in order to avoid damage to the usually relatively sensitive gas analysis unit 133.

The gas analysis unit 133 can thus be used to feed in gaseous, cleaned fluid, which is only subject to relatively small pressure fluctuations, with a relatively constant volumetric flow. With the gas analysis unit 133, the gaseous components in the composition of the gaseous fluid can be detected with regard to critical, in particular explosive, gases such as methane. For this purpose, the gas analysis unit 133 expediently has a very precise volumetric flow meter with a quantity adjustment wheel coupled thereto for very precise metering of the gaseous fluid supplied to a gas sensor of the gas analysis unit 133.

The connections 203, 209, 212, 215, 218, which are accessible to an operator from the front during normal operation, can each be closed and opened via a stopcock. As a result, particularly when the extraction line connection 203 is closed, pressurized air can be fed through the air connection 209 and water can be fed through the water connection 218 with the connected water line arrangement 221 for rinsing in particular the fluid mixture line arrangement 206 with flow in both directions. When the corresponding stopcock is opened and the other stopcocks are closed, a test gas can be passed through the test gas connection 212 to check the functionality of the fluid processing unit 127 and in particular the gas analysis unit 133.

FIG. 3 shows a perspective view of the exemplary embodiment of a fluid processing unit 127 according to FIG.

2 with a view of the rear side facing away from the front side. The part of the gas line arrangement 236 with the components integrated into it that is not visible in the representation according to FIG. 2 can be seen in FIG. 3. In particular, it can be seen from the illustration according to FIG. 3 that the gas line arrangement 236 is equipped with a shut-off valve 303, with which, in the front area in the direction of flow of the gaseous fluid flowing in the gas line arrangement 236, for example in cases such as a critical fill level in the separation module 224, a blocking of the rear region in the flow direction can take place. Furthermore, the arrangement of the Y-junction 254 in the form of a T-piece with the neck of the T on the inlet side of the secondary arm 260 can be clearly seen from the representation according to FIG. 3. Moreover, it can be seen from FIG. 3 that the separators 227, 230 are each provided with a filling level sensor 306, by means of which a warning signal can be generated to the effect that the contents of the separators 227, 230 can be discharged by an operator via the discharge line arrangement 233 at a maximum filling level.

FIG. 4 shows a perspective view of a further exemplary embodiment of a fluid processing unit 127 with a view of a front side accessible to an operator during operation, corresponding to the illustration according to FIG. 2, wherein in the exemplary embodiment of a fluid processing unit 127 explained with reference to FIGS. 2 and 3, and in the exemplary embodiment of a fluid processing unit 127 of FIG. 4, corresponding components are provided with the same reference symbols and are not explained in more detail below to avoid repetition.

The exemplary embodiment according to FIG. 4 differs from the exemplary embodiment according to FIG. 2 and FIG. 3 essentially in the fact that the flow control valve 251 is integrated in the main arm 257 upstream of the volumetric flow measurement module 266 with a main flow filter module 403, which is arranged upstream for protection in particular in case of a low-lying arrangement in the lower region of the fluid processing unit 127. A check valve 263 is not provided in the embodiment according to FIG. 4. The exemplary embodiment of a fluid processing unit 127 according to FIG. 4 is characterized in that by setting the flow rate in the main arm 257, the flow rate in the secondary arm 260 can be adjusted with a relatively high accuracy, which increases the measurement precision of the gas analysis unit 133.

The exemplary embodiment of FIG. 2 and FIG. 3 and the exemplary embodiment of FIG. 4 have in common that the pressure adjustment, pressure stabilization and flow rate adjustment for proper operation of the gas analysis unit 133 occur via the sequence in the flow direction of the fluid formed by the pressure reducer 239, the double diaphragm pump 245, the pressure stabilizer 248 and the flow control valve 251 with subsequent division at the Y-junction 254 into a main arm 257 with a larger flow rate and in a secondary arm 260 with a lower flow rate in the direction of the gas analysis unit 133. As a result, the content of critical gas in the gaseous fluid can be determined largely without delay, even under strongly changing ambient conditions in the mining chamber 118, at least so precisely that, for example, the presence of explosive methane in a safety-relevant concentration can be detected reliably and relatively quickly.

The invention claimed is:

1. A tunnel boring machine with a device for detecting a content of critical gas in a cavity (118) rearward of a cutting wheel (106) with an extraction line (124) that extends between a mining chamber (118) as a cavity and the device, with a separation module (224) for separating the gas to be detected from a fluid and with a gas analysis unit (133) downstream of the separation module (224), wherein a metering module (240) for controlled charging of a gas analysis unit (133) with separated gas is arranged downstream of the separation module (224), that the metering module (240) has a pressure reducer (239) and a flow control valve (251) downstream of the pressure reducer (239), and that a double diaphragm pump (245) is provided downstream of the pressure reducer (239).

2. The tunnel boring machine of claim 1, wherein two diaphragms of the double diaphragm pump (245) are forcibly coupled to one another and that the diaphragms can be controlled alternately via a control air line (244) by a magnetic control switch (243) with pressurized control air.

3. The tunnel boring machine of claim 2, wherein the double diaphragm pump (245) is connected to a first throttle valve (241) and to a second throttle valve (242), the opening degrees of which can be adjusted to a relatively small value in such a way that the escaping service air of the diaphragm escapes into an environment with a great deal of delay.

4. The tunnel boring machine of claim 1, wherein there is a pressure stabilizer (248) which is arranged between the double diaphragm pump (245) and the flow control valve (251).

5. The tunnel boring machine of claim 1, wherein the flow control valve (251) is a needle valve.

6. The tunnel boring machine of claim 1, wherein there is a volumetric flow measuring module (266) which is arranged downstream of the flow control valve (251).

7. The tunnel boring machine of claim 1, wherein downstream of the pressure reducer (239) there is a Y-junction (254) which is asymmetrical with regard to the divided volumetric flows and has a downstream main arm (257) and a downstream secondary arm (260) and that the volumetric flow measuring module (266) is arranged in the main arm (257) downstream of the Y-junction (254).

8. The tunnel boring machine of claim 7, wherein a secondary arm filter module (269) is arranged in the secondary arm (260).

9. The tunnel boring machine of claim 7, wherein the flow control valve (251) is arranged between the pressure reducer (239) and the Y-junction (254).

10. The tunnel boring machine of claim 7, wherein the flow control valve (251) is arranged downstream of the Y-junction (254) in the main arm (257).

11. The tunnel boring machine of claim 10, wherein a main flow filter module (403) is present in the main arm (257) between the Y-junction (254) and the flow control valve (251).

12. The tunnel boring machine of claim 7, wherein a gas analysis unit (133) is arranged downstream of the secondary arm (260) and is set up to detect explosive gas.

* * * * *